(12) United States Patent
Arno et al.

(10) Patent No.: US 6,716,271 B1
(45) Date of Patent: Apr. 6, 2004

(54) APPARATUS AND METHOD FOR INHIBITING DECOMPOSITION OF GERMANE

(75) Inventors: Jose Arno, Brookfield, CT (US); Edward Sturm, New Milford, CT (US); Luping Wang, Brookfield, CT (US); James Dietz, Scarsdale, NY (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 10/282,377

(22) Filed: Oct. 29, 2002

(51) Int. Cl.$^7$ ................................................ B01D 53/04
(52) U.S. Cl. ......................... 95/133; 95/901; 96/113; 96/143; 96/146
(58) Field of Search ................... 95/96, 106, 114, 95/115, 133, 901; 96/108, 113, 143, 146

(56) References Cited

U.S. PATENT DOCUMENTS

| | | | |
|---|---|---|---|
| 5,518,528 A | | 5/1996 | Tom et al. |
| 5,676,735 A | * | 10/1997 | McManus ...................... 95/15 |
| 5,704,965 A | * | 1/1998 | Tom et al. ...................... 95/95 |
| 5,837,027 A | * | 11/1998 | Olander et al. ................. 95/14 |
| 5,980,608 A | | 11/1999 | Dietz et al. |
| 6,083,298 A | | 7/2000 | Wang et al. |
| 6,089,027 A | | 7/2000 | Wang et al. |
| 6,132,492 A | | 10/2000 | Hultquist et al. |
| 6,406,519 B1 | * | 6/2002 | Tom et al. ...................... 95/95 |
| 6,453,924 B1 | * | 9/2002 | Wang et al. .................... 137/1 |
| 2001/0022135 A1 | * | 9/2001 | Murai .......................... 95/138 |
| 2002/0078825 A1 | * | 6/2002 | Funke et al. .................. 95/117 |
| 2003/0024390 A1 | * | 2/2003 | Funke et al. .................. 95/143 |
| 2003/0106429 | * | 6/2003 | Wang et al. .................... 95/90 |

* cited by examiner

Primary Examiner—Robert H. Spitzer
(74) Attorney, Agent, or Firm—Margaret Chappuis; Steven J. Hultquist; William F. Ryann

(57) ABSTRACT

A germane storage and dispensing system, in which germane gas is sorptively retained on an activated carbon sorbent medium in a vessel containing adsorbed and free germane gas. The activated carbon sorbent medium is deflagration-resistant in relation to the germane gas adsorbed thereon, i.e., under deflagration conditions of 65° C. and 650 torr, under which free germane gas undergoes deflagration, the activated carbon sorbent medium does not sustain deflagration of the adsorbed germane gas or thermally desorb the germane gas so that it undergoes subsequent deflagration. The deflagration-resistance of the activated carbon sorbent medium is promoted by pre-treatment of the sorbent material to remove extraneous sorbables therefrom and by maintaining the fill level of the sorbent medium in the gas storage and dispensing vessel at a substantial value, e.g., of at least 30%.

27 Claims, 5 Drawing Sheets

APPARATUS AND METHOD FOR INHIBITING DECOMPOSITION OF GERMANE

BACKGROUND OF THE INVENTION

1. Field of the Invention

The present invention relates to apparatus and method for inhibiting decomposition of germane, and to semiconductor process systems including such apparatus and arranged to carry out such method.

2. Description of the Related Art

Germane ($GeH_4$) is a highly reactive gas that is susceptible to spontaneous decomposition. Depending on the speed of the reaction, the spontaneous decomposition of germane can lead to deflagration (sub-sonic reaction) or explosion (supersonic reaction).

Spontaneous decomposition of germane in a sealed package, e.g., a closed vessel holding such gas, may lead to very rapid increase in pressure and temperature in the package. In extreme cases, runaway increases in pressure and temperature may occur, which exceed the corresponding thermal and baric limits of the package, resulting in bursting of the package and dispersion of germane into the ambient environment.

Random deflagration of germane is known to occur. In consequence, the packaging densities of germane are typically limited by the pressures that could be attained upon decomposition of the material. The decomposition reaction $$GeH_4(g) \rightarrow Ge(s) + 2H_2(g)$$

indicates that the molar quantities of the product double the initial value (molar quantity of gas). This effect, combined with the exothermic character of the decomposition reaction, results in a rapid and substantial increase in pressure inside the vessel in deflagration as well as in explosion events.

The foregoing decomposition susceptibility of germane has greatly limited the commercial application of this gas. While germane is very useful in semiconductor manufacturing as a source reagent for germanium (Ge), e.g., as a dopant or bulk component in semiconductor films and materials, the risk of fire and explosion attendant its use have caused other, less suitable Ge source reagents to be employed, or alternatively, double-containment vessels, flame arrestor systems and other safety equipment must be employed to ensure that the risk of spontaneous decomposition does not jeopardize the semiconductor manufacturing facility and its operating personnel.

It would therefore be a substantial advance in the art to provide an apparatus and method for the use of germane gas that avoids the aforementioned deficiencies of the prior art.

SUMMARY OF THE INVENTION

The present invention relates generally to apparatus and method for providing germane in a manner that substantially reduces the risk and consequences of spontaneous decomposition of germane gas.

In an apparatus aspect, the invention relates to a germane storage and delivery system, including:

a gas storage and dispensing vessel having an enclosed interior volume;

activated carbon sorbent medium in the interior volume of said gas storage and dispensing vessel;

germane gas in said gas storage and dispensing vessel, said germane gas comprising germane gas adsorbed on said sorbent medium in said interior volume and free germane gas present in said interior volume in a non-adsorbed state;

means for desorbing germane from said sorbent medium and dispensing same from the vessel;

wherein the activated carbon sorbent medium is deflagration-resistant in relation to the germane gas adsorbed thereon, under conditions in which said free germane gas in said interior volume in a non-adsorbed state undergoes deflagration.

In a method aspect, the invention relates to a germane storage and dispensing method comprising:

physically adsorbing germane gas on an activated carbon sorbent medium in a containment zone also comprising free germane gas in a non-adsorbed state;

selectively desorbing germane from said activated carbon sorbent medium and discharging same from the containment zone;

wherein the activated carbon sorbent medium is deflagration-resistant in relation to the germane gas adsorbed thereon, under conditions in which said free germane gas in said containment zone in a non-adsorbed state undergoes deflagration.

The deflagration-resistance of the activated carbon sorbent medium and the conditions under which free germane gas in the interior volume of the gas storage and dispensing vessel undergoes deflagration, is measured at a temperature of 65° C. and a pressure of 650 torr.

In a further aspect, the invention relates to a method of preparing an activated carbon sorbent material for use, such method comprising:

purging the sorbent material with inert gas;

evacuating the inert gas from the sorbent material;

heating the sorbent material under vacuum to elevated temperature, and maintaining such vacuum and elevated temperature for sufficient time to dehydrate the sorbent material;

cooling the sorbent material under vacuum to ambient temperature;

passivating the sorbent material with a sorbate gas to which the sorbent material has sorptive affinity, at elevated temperature;

removing sorbate gas from the sorbent material; and cooling the sorbent material under vacuum to ambient temperature.

Other aspects, features and advantages of the invention will be more fully apparent from the ensuing disclosure and appended claims.

DETAILED DESCRIPTION OF THE INVENTION, AND PREFERRED EMBODIMENTS THEREOF

Figure 1:
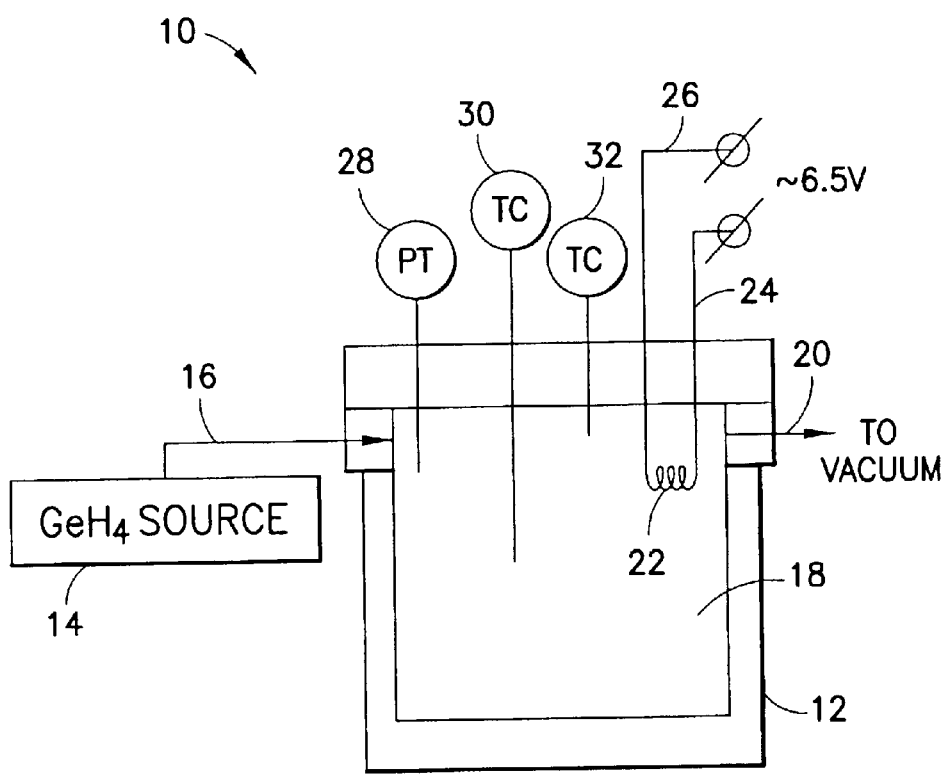
FIG. 1 is a schematic representation of a germane deflagration test apparatus.

The present invention is based on the discovery that germane may be stored in a physically adsorbed state in a fluid storage and dispensing vessel, on a sorbent medium comprising an activated carbon sorbent that has been subjected to pretreatment in a manner more fully described hereinafter, so that the fluid storage and dispensing vessel contains the sorbent with germane sorptively retained thereon, as well as free germane, and that such storage of germane gas provides surprising and unexpected anti-deflagrative stability.

The surprising and unexpected character of this discovery resides in the facts that:

(i) germane per se is highly susceptible to decomposition;

(ii) activated carbon, although produced as a pyrolysis (charring) product, is a combustible material; and (iii) germane may be physically adsorbed on activated carbon, and readily desorbed therefrom by a variety of desorptive mechanisms, including heating of the activated carbon adsorbent, pressure-differential-mediated desorption, entrainment into a carrier gas contacted with the activated carbon so that the adsorbed germane is desorbed by concentration gradient-mediated mass transfer, which taken together would suggest that exposure of the interior volume of the storage and dispensing vessel (containing the activated carbon sorbent with germane adsorbed thereon, as well as free germane in the interstices of the sorbent bed, and free germane in the head space above the sorbent bed in the interior volume) to spark, flame, or other conditions causing deflagration of germane would:

(a) cause the free germane to combust and rapidly decompose to form a twice larger molar volume of reaction product gas (hydrogen) which itself is flammable and explosive, with concomitant evolution of substantial heat and rapid temperature rise;

(b) cause thermally-mediated desorption of germane sorptively held on the activated carbon adsorbent, as a result of the heat and temperature rise generated by the deflagration of the "free" interstitial and head space germane gas; and (c) propagate the deflagration throughout the entire inventory of germane gas in the vessel, particularly since the activated carbon material itself is susceptible to burning.

Surprisingly, although deflagration of the free headspace germane does occur, the deflagration does not propagate into the germane adsorbed on the activated carbon, there is no significant desorption of germane from the sorbent material, the carbon sorbent does not sustain combustion, and the adsorbed germane is retained in undegraded condition, without the occurrence of fire, explosion and rupture of the vessel.

The foregoing discovery therefore enables the use of germane gas as a reagent, without the risk and dangers attendant the use of germane gas in high pressure cylinders in the manner of the prior art.

The present invention, when practiced with gas storage and dispensing vessels of the type disclosed and claimed in U.S. Pat. No. 5,518,528 issued May 21, 1996 in the names of Glenn M. Tom, et al., featuring a vessel including a gas dispensing assembly coupled thereto, in which the vessel contains in the interior volume thereof a physical sorbent medium holding a sorbed gas thereon, permits the storage of germane at low pressures, since the vapor pressure of the adsorbed germane gas on the sorbent medium is negligible in relation to ambient (atmospheric) pressure. The disclosure of U.S. Pat. No. 5,518,528 hereby is incorporated herein by reference in its entirety.

The low vapor pressure of the adsorbed gas means that the only contribution to the interior pressure of the gas storage vessel is from the free gas in the interstices of the sorbent bed particles in the vessel, and from the free gas in the head space of the vessel.

As a result, low germane storage pressures are possible, while at the same time maintaining a substantial inventory of germane gas in the sorbed state on the sorbent medium, for sustained dispensing of germane from the vessel during dispensing conditions.

To achieve the deflagration-resistant storage of germane in accordance with the invention, a sufficient quantity of activated carbon sorbent medium is required in the gas storage and dispensing vessel, so that the amount of adsorbed germane gas is substantially greater than the amount of free germane gas in the interior volume of the vessel. Consistent with this objective, it is preferred that at least 30% of the interior volume of the vessel is occupied by the activated carbon sorbent medium, more preferably at least 75% of such volume, and most preferably at least 90% of the interior volume of the gas storage and dispensing vessel.

The dispensing operation may be carried out in any suitable manner, including the heating of the vessel and sorbent bed therein, so that germane is thermally desorbed from the sorbent particles of activated carbon in the vessel, or alternatively by entrainment in a carrier gas that is flowed through the adsorbent bed, as described in U.S. Pat. No. 5,980,608 issued Nov. 9, 1999 in the names of James Dietz and James V. McManus, the disclosure of which hereby is incorporated herein by reference in its entirety. By such flow of carrier gas through the vessel, a mass transfer concentration gradient driving force is established, and the resulting desorption of the gas into the carrier gas provides a product gas stream that can be modulated by the flow, temperature and pressure of the carrier gas flow, to achieve a specific concentration of the germane in the carrier gas.

Preferably, however, the germane gas is dispensed by a pressure difference upon actuating the dispensing assembly coupled with the vessel to open a flow control valve therein (e.g., a valve in a valve head assembly connected to the neck of the vessel), so that the pressure differential mediates the desorption of the germane from the activated carbon sorbent medium.

The invention is also applicable to gas storage and dispensing systems of the type described in U.S. Pat. No. 6,089,027 issued Jul. 18, 2000 in the names of Luping Wang and Glenn M. Tom, wherein the gas storage and dispensing vessel contains a pressure regulator upstream of a flow control valve, so that dispensed fluid is flowed through the pressure regulator prior to flow through the flow control valve, and wherein the vessel holds activated carbon sorbent material sorptively retaining germane thereon. The pressure regulator may be interiorly disposed in the vessel, so that moving parts of the regulator assembly, particularly when the regulator is adjustable in character, may occasion the incidence of spark or heat generation during their movement which can produce deflagration conditions in the vessel. As empirically shown more fully hereinafter, such deflagration may occur with the headspace gas (free germane), but will not propagate into the adsorbed gas inventory of the vessel.

The disclosure of U.S. Pat. No. 6,089,027 is hereby incorporated herein by reference herein in its entirety.

In another embodiment of the invention, the gas storage and dispensing vessel may contain, in addition to the sorbent medium sorptively retaining the germane gas, a quantity of a hydrogen getter, e.g., in a capsule including a hydrogen-permeable membrane, so that any decomposition of the germane gas, e.g., during deflagration of head space gas, is chemisorbed by the hydrogen getter, so that pressure increases incident to decomposition are minimized. Hydrogen gettering devices of such type are more fully described in U.S. Pat. No. 6,132,492 issued Oct. 17, 2000 in the names of Steven J. Hultquist, et al., the disclosure of which hereby is incorporated herein in its entirety.

As a still further embodiment of the invention, the interior volume of the storage and dispensing vessel may have disposed in the interior volume thereof a hydrogen sensor, which upon sensing of evolved hydrogen gas in the interior volume incident to decomposition of germane therein, emits a control signal that may be sent to a microprocessor or central processing unit, to monitor the presence of hydrogen gas and the extent of decomposition of germane in the vessel, so that remedial action can be taken.

The pretreatment of the activated carbon sorbent in the practice of the invention involves treating the physical sorbent material to desorb from the sorbent material extraneous sorbables, by steps such as:

(a) heating the physical sorbent material to thermally desorb extraneous sorbables therefrom;

(b) flowing a non-sorbable gas in contact with the physical sorbent material to desorb the extraneous sorbables from the physical sorbent material into the flowing non-sorbable gas; and (c) applying vacuum conditions to the physical sorbent material to vacuum desorb the extraneous sorbables from the physical sorbent material, as more fully described in U.S. Pat. No. 6,083,298 issued Jul. 4, 2000 in the names of Luping Wang, et al.

The disclosure of U.S. Pat. No. 6,083,298 hereby is incorporated herein by reference in its entirety.

The sorbent material in the broad practice of the present invention may be pretreated, activated or processed in any suitable manner, as necessary or desired, to yield a sorbent medium of the desired form and performance characteristics, e.g., sorptive capacity, porosity, residual heels, etc., for use in the gas storage and dispensing system of the invention. For example, the sorbent material may be subjected to a thermal pretreatment process involving exposure to selected activating and/or passivating gases at elevated temperatures, with intermittent and/or successive evacuation and inert purging steps.

In one illustrative embodiment, the sorbent medium employed in the gas storage and dispensing system comprises an activated carbon that is pretreated in accordance with the following procedure.

The activated carbon sorbent first is cyclically purged with helium or other inert gas and evacuated, following which the sorbent is heated under vacuum to elevated temperature, e.g., a temperature on the order of 250° C., and vacuum baked for an extended period of time, such as 18 hours, to eliminate any moisture content of the sorbent. The sorbent then is cooled to ambient (room) temperature under vacuum, and again cyclically purged with helium or other inert gas and evacuated.

Next, a predetermined amount of germane, e.g., about 2% by weight of germane, based on the weight of the sorbent, is introduced. The resulting sorbent and gas are then sealed in a vessel and heated to about 200° C., while pressure is monitored. This effects passivation of overly active sites. The temperature is held at 200° C. until pressure stops increasing and for a predetermined additional period of time, e.g., 1 day. At the end of the additional period, the vessel is evacuated at 200° C. for about 4 hours and then cooled to room temperature under vacuum. The sorbent in the vessel at the conclusion of such cooling can be loaded with germane gas.

It will be recognized that the pretreatment procedure illustratively described above for an exemplary activated carbon sorbent may be significantly varied in practice, depending on the character of the specific sorbent utilized, and that other steps may be required or usefully employed in specific instances, to provide the sorbent in a form suitable for storage and dispensing of germane. For example, activation of carbon sorbent media may be employed, or thermal processing to vary the pore size and/or pore size distribution, or other steps of a type and character that are useful in the specific circumstances and/or for the specific materials employed.

The sorbent material used in the practice of the invention comprises a carbonaceous adsorbent medium. As used herein, the term "carbonaceous" in reference to the physical sorbent material of the invention, means that the sorbent material comprises elemental carbon as its major component in the sorbent mass. Preferred forms of carbon sorbent materials include: carbon formed by pyrolysis of synthetic hydrocarbon resins such as polyacrylonitrile, polyacrylamides, sulfonated polystryrenedivinylbenzene, polyvinylidene chloride, furfuryl alcohol, etc.; cellulosic char; charcoal; activated carbon formed from natural source materials such as coconut shells, pitch, wood, petroleum, coal, etc.

The carbon sorbent material may be activated by heating granulated charcoal to appropriate elevated temperature. Most preferred are the so-called bead carbon forms of activated carbon, where the beads, i.e., highly uniform diameter spherical particles, may have a diameter in the range of from about 0.1 to about 1 centimeter, and more preferably from about 0.25 to about 2 millimeters diameter, as well as other high fill density microporous carbon forms.

Commercially available carbon sorbent materials which are preferred in the broad practice of the invention include bead carbon materials designated as BAC-MP, BAC-LP, and BAC-G-70R, available from Kreha Corporation of America, New York, N.Y.; Ambersorb® carbonaceous sorbents commercially available from Rohm & Haas Company, Philadelphia, Pa. as grades Ambersorb® 563, Ambersorb® 564, Ambersorb® 348F, Ambersorb® 575, Ambersorb® 572, and Ambersorb® 1500; Calgon Filtrasorb 400® and BPL GAC carbon sorbent materials commercially available from Calgon Carbon Corporation; and bead activated carbon sorbent materials commercially available from Blucher GmbH, Erkrath, Germany. The aforementioned Ambersorb materials have substantial pore volume in pores greater than 50 Angstroms, and in general such large pore sized materials are less preferred than those having pores not exceeding about 40 Angstroms.

The sorbent used in the storage and dispensing system of the invention may have any suitable size, shape and conformation appropriate to the end use application and the specific sorbate fluid species involved. The sorbent material may for example be in the form of beads, granules, pellets, tablets, powders, particulates, extrudates, cloth or web form materials, honeycomb matrix monolith, composites (of the carbon sorbent with other components), or comminuted or crushed forms of the foregoing conformations.

Collectively, the storage and delivery system of the present invention may usefully consist of a standard gas cylinder, and a cylinder valve or other flow dispensing assembly (regulators, monitors, sensors, flow directing means, pressure controllers, mass flow controllers, piping, valving, instrumentation, automatic start and shut-off devices, etc.) coupled to the cylinder, with the cylinder holding the sorbent material, and wherein the cylinder is filled, e.g., to 1 atmosphere pressure, with germane gas.

Fluid flow from the storage and delivery system of the invention by pressure differential desorption may be readily carried out by utilizing a pressure differential between the pressure in the interior volume of the storage and delivery system and a lower pressure exterior to the sorbent-containing vessel.

Germane gas may be held in the germane storage and dispensing vessel at any suitable pressure, as for example a pressure in a range from about 10 to about 750 torr, or alternatively, greater pressures (e.g., superatmospheric pressures, such as up to about 50 psig) or lesser pressures may be employed. The benefit of the activated carbon sorbent medium in the germane storage and dispensing vessel is that the germane gas may be retained in a substantial volume at low pressure in the adsorbed state.

For example, the sorbent-containing vessel may hold germane gas at a subatmospheric pressure, e.g., 600 Torr, for use in an ion implantation process, where the ion implant chamber for implanting the germanium constituent is maintained under vacuum conditions or alternatively at low pressure, e.g., below 100 Torr, below the pressure of the interior volume in the storage and dispensing vessel. As a result, germane gas will desorb from the sorbent in the vessel and flow to the ion implant chamber, when gas flow communication is established between the ion implant chamber and the storage and dispensing vessel containing the sorbate germane gas. The storage and dispensing system thus effects flow of the germane gas through the connecting piping, valving and instrumentation, and is readily controllable at a desired flow rate. Utilizing a device such as a mass flow controller, a constant flow can be achieved as the sorbent vessel pressure decreases with continued dispensing operation.

Additionally, or alternatively, the gas dispensing assembly of the storage and dispensing system of the invention may include means for heating the sorbent material, to thermally desorb sorbate fluid therefrom. Such heating means may include any suitable heat transfer or heat exchange devices, structures or apparatus, which are operatively associated with the sorbent material to effect heating thereof, for thermal desorption of the sorbate from the sorbent medium. Thus, the present invention contemplates heat- and/or pressure-mediated dispensing of germane from the sorbent on which same is stored.

The specific activated carbon sorbent materials used in the practice of the invention, and their pore size, pore volume, and surface area characteristics may be widely varied in the broad practice of the present invention. The skilled artisan may readily determine suitable sorbent characteristics for a given end use application of the storage and dispensing system of the present invention without undue experimentation using surface area and porosity determinations, e.g., with mercury porosimetry techniques, and affinity studies for the particular fluid sought to be stored on and dispensed from the particular candidate sorbent material.

The features and advantages of the invention are more fully shown by the following non-limiting examples.

EXAMPLE 1

In this test, a deflagration study was conducted, using free (non-adsorbed) germane, using a germane deflagration test apparatus 10 as schematically shown in FIG. 1.

The test apparatus 10 included a stainless steel pressure vessel 12 coupled to a germane source 14 by means of feed conduit 16 communicating with the interior volume 18 of the vessel. The vessel also included a gas discharge line 20 coupled to a vacuum pump (not shown).

In the interior volume 18 of the vessel 12 was disposed an ignition coil 22 joined to electrical leads 24 and 26, as shown, extending through the cover of the closed vessel 12. The vessel 12 was also equipped with a mid-vessel temperature sensor 30, a top-end temperature sensor 32, as well as a pressure transducer 28 for sensing the pressure in the interior volume of the vessel.

In operation of the test system shown in FIG. 1, temperature sensors (thermocouples) 30 and 32 and the fast-response pressure transducer 28 monitored the temperature and pressure conditions in the interior volume 18 of the vessel as the hot filament of the heating coil 22 was subjected to a voltage of 6.5 volts and initiated deflagration of the germane flowed into the vessel from source 14, with the gas being removed from the vessel in the discharge line 20. Prior to ignition, a pressure of 650 torr of germane was maintained in the vessel.

Figure 2:
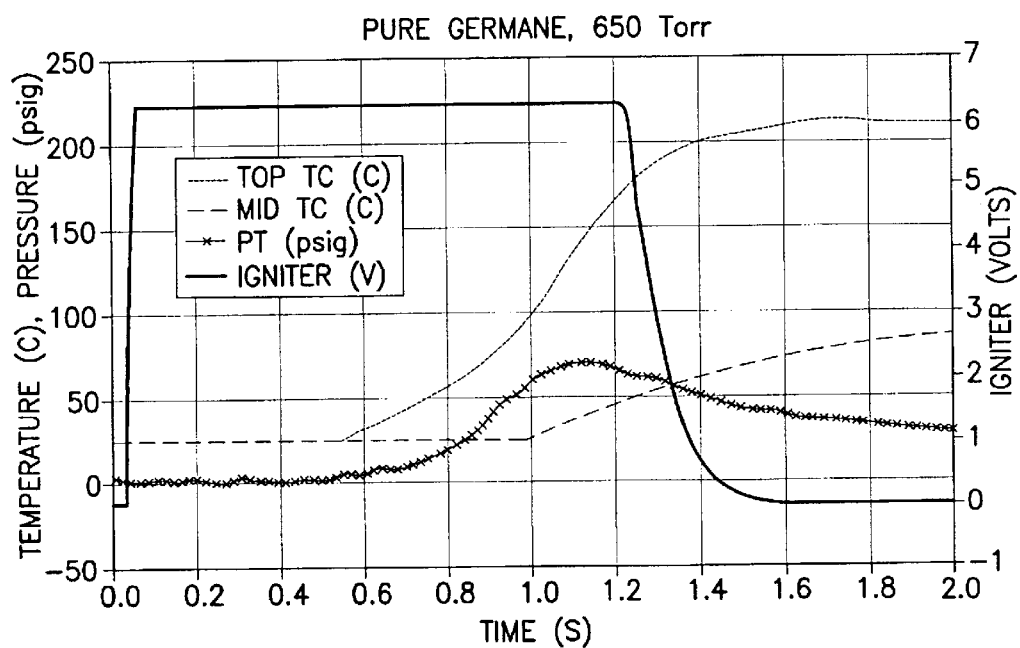
FIG. 2 is a graph of temperature, in degrees Centigrade, pressure, in psig, and ignitor voltage, as a function of time, in seconds, for free germane deflagration, generated by the test apparatus schematically shown in FIG. 1.

Upon ignition of the germane gas in the vessel by the hot filament, the pressure increased as shown in FIG. 2, which is a graph of temperature, in degrees Centigrade, pressure, in psig, and ignitor voltage, as a function of time, in seconds, for the free germane deflagration, generated by the test apparatus schematically shown in FIG. 1. The ignition-mediated pressure increase was over five times the original 650 torr pressure, to 70 psig, and temperature reached a maximum of 210° C.

EXAMPLE 2

Figure 3:
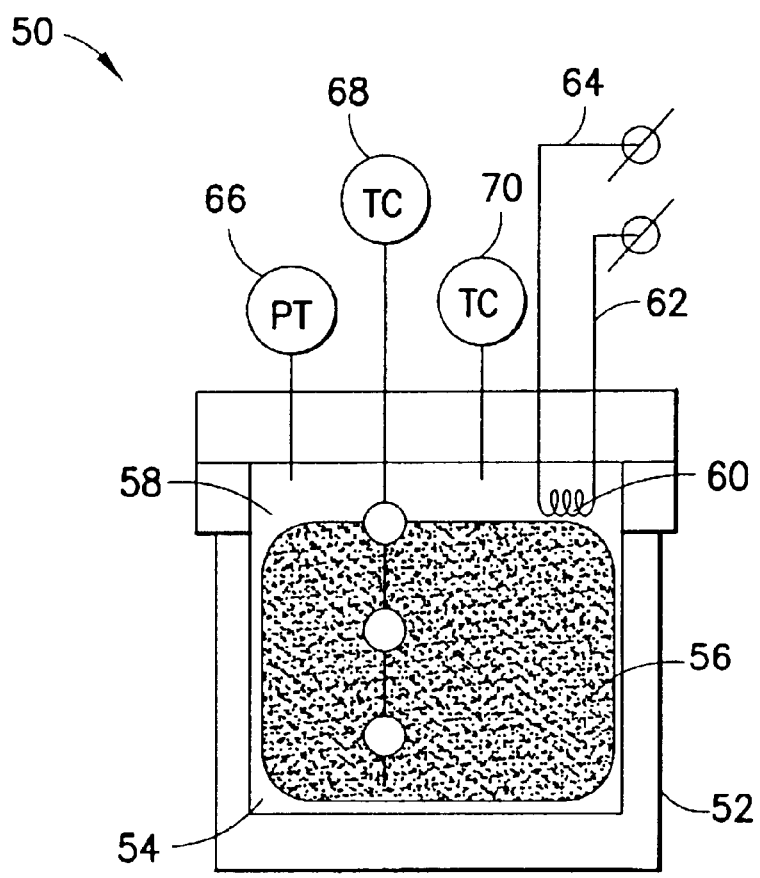
FIG. 3 is a schematic representation of another germane deflagration test apparatus wherein germane is adsorbed on a carbon adsorbent material.

In this test, a deflagration study was conducted, using another deflagration test apparatus as shown in FIG. 3.

The deflagration test apparatus 50 shown in FIG. 3 comprised a stainless steel vessel 52 enclosed by a top cover to define an interior volume 54 therewithin. In the interior volume is disposed a bed 56 of activated carbon adsorbent particles having germane gas adsorbed thereon, with free germane gas being present in the headspace 58 of the vessel.

The test vessel interior volume was 90% filled with the sorbent medium having germane adsorbed thereon, with the headspace occupying the remaining 10% of the interior volume of the vessel. The activated carbon sorbent was pretreated before being placed in the interior volume of the vessel, as described previously herein.

In the interior volume of the vessel was disposed an ignition coil 60 connected to electrical leads 62 and 64, as shown. The interior volume pressure condition was monitored by a fast-action pressure transducer 66, and the temperatures in the interior volume were monitored at the lower end, mid-section and upper end of the sorbent bed by thermocouple temperature sensor 68 and the temperature of the vessel headspace was monitored by thermocouple temperature sensor 70.

As in Example 1, temperatures and pressures were datalogged to characterize the changes after ignition at a temperature of 65° C.

Figure 4:
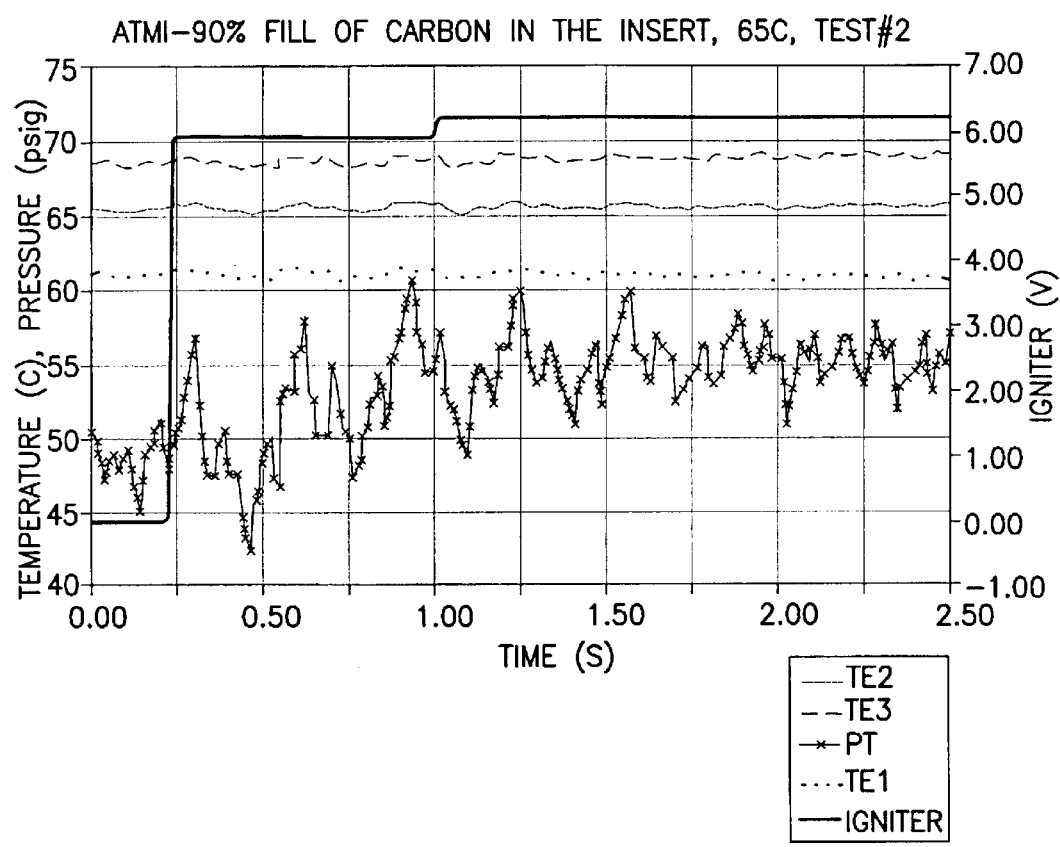
FIG. 4 is a graph of temperature, in degrees Centigrade, pressure, in psig, and ignitor voltage, as a function of time, in seconds, for free germane deflagration, generated by the test apparatus schematically shown in FIG. 3.

The results of the deflagration test are shown in FIG. 4, which is a graph of temperature, in degrees Centigrade, pressure, in psig, and ignitor voltage, as a function of time, in seconds, for free germane deflagration, generated by the test apparatus schematically shown in FIG. 3.

The results of this test indicated that the absorbed germane did not deflagrate. Minor increases in temperature and pressure correlated directly with deflagration of the germane present in the head space (the 10% of the vessel interior volume that was not filled with activated carbon adsorbent).

Most importantly, the reaction that initiated in the headspace did not propagate to the germane molecules absorbed on the carbon. After completion of the test, the absorbed germane was desorbed to confirm that it was not degraded. Quantitative analysis of the material corroborated that the initial germane material remained intact.

Figure 5:
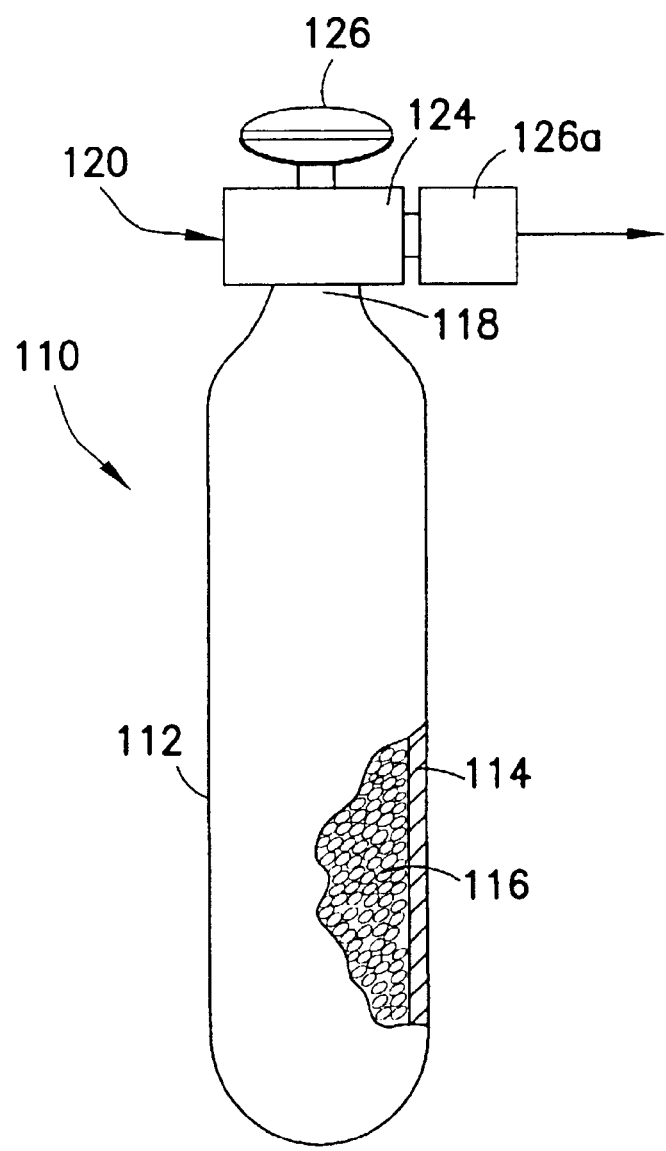
FIG. 5 is a schematic representation of a germane storage and dispensing apparatus according to one embodiment of the present invention.

FIG. 5 is a schematic representation of a germane storage and dispensing apparatus according to one embodiment of the present invention.

The gas storage and dispensing system 110 includes a gas storage and dispensing vessel 112 which may be in the form of a conventional gas cylinder with a cylindrical wall 114 enclosing an interior volume.

In the interior volume of the vessel 112 is disposed an activated carbon physical sorbent material 116. The sorbent material is typically employed in a finely divided form, such as pellets, beads, granules, or the like, to provide a bed of the sorbent material having high surface area as measured by standard porosimetry (e.g., Brunnauer-Emmit-Teller) methodology.

The gas storage and dispensing vessel 112 is of elongate character as shown, with a neck 118 to which is joined a valve head assembly 120, which in the embodiment shown includes a unitary block valve body 124, having a hand wheel 126 coupled thereto for manual opening and closure of the valve in the valve body. The valve body 124 has a coupling 126(a), such as a VCR connector, associated therewith, for dispensing of germane gas desorbed from the sorbent material in the gas storage and dispensing vessel, when the hand wheel 126 is turned to open the valve in the valve body 124.

By such arrangement, the germane gas may be released from the gas storage and dispensing container, when the exterior pressure of the downstream dispensing locus is below the pressure of the interior volume of the vessel 112, as for example is the case in ion implantation applications, in which the downstream ionizer is maintained at very low pressure conditions.

Alternatively, the coupling 126(a) may join the gas storage and dispensing vessel 112 to a manifold or flow circuit containing a pump, blower, ejector, eductor, compressor, fan, cryopump, pressure-building circuit, or other motive fluid impeller device serving to extract the germane sorbate gas from the sorbent material bed in the vessel 112.

As a still further alternative, the vessel 112 or the sorbent material therein may be directly or indirectly heated to effect thermal desorption of the dispensing gas from the sorbent material in the vessel. For example, the vessel 112 may be disposed in a heating jacket (not shown), or have heating coils (likewise not shown) interiorly disposed in the vessel throughout the sorbent bed, for such purpose.

The system 110 shown illustratively in FIG. 5 therefore permits the selective dispensing of germane gas from the physical sorbent material in the vessel 112, in any suitable dispensing modality (pressure differential-mediated desorption and/or thermally mediated desorption), to discharge the dispensing gas from the vessel.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art. The invention therefore is to be broadly construed, consistent with the claims hereafter set forth.

What is claimed is:

1. A method of storing and dispensing germane, comprising physically adsorbing germane gas on an activated carbon sorbent medium in a containment zone also comprising free germane gas in a non-adsorbed state;

selectively desorbing germane from said activated carbon sorbent medium and discharging same from the containment zone;

wherein the activated carbon sorbent medium is deflagration-resistant in relation to the germane gas adsorbed thereon, under conditions in which said free germane gas in said containment zone in a non-adsorbed state undergoes deflagration, said activated carbon sorbent medium having been pretreated for passivation of active sites thereof, by contact with a pretreating amount of germane gas at elevated temperature, and desorption of said pretreating amount of germane gas from the activated carbon sorbent medium, before the step of physically adsorbing germane gas on an activated carbon sorbent medium in a containment zone also comprising free germane gas in a non-adsorbed state.

2. A germane storage and dispensing system, comprising:

a gas storage and dispensing vessel having an enclosed interior volume;

activated carbon sorbent medium in the interior volume of said gas storage and dispensing vessel;

germane gas in said gas storage and dispensing vessel, said germane gas comprising germane gas adsorbed on said sorbent medium in said interior volume and free germane gas present in said interior volume in a non-adsorbed state;

means for desorbing germane from said sorbent medium and dispensing same from the vessel;

wherein the activated carbon sorbent medium is deflagration-resistant in relation to the germane gas adsorbed thereon, under conditions in which said free germane gas in said interior volume in a non-adsorbed state undergoes deflagration, said activated carbon sorbent medium having been pretreated for passivation of active sites thereof, by contact with a pretreating amount of germane gas at elevated temperature, and desorption of said pretreating amount of germane gas from the activated carbon sorbent medium, before said germane gas comprising germane gas adsorbed on said sorbent medium in said interior volume and free germane gas present in said interior volume in a non-adsorbed state, is provided in said gas storage and dispensing vessel.

3. The germane storage and dispensing system of claim 2, wherein the activated carbon sorbent medium occupies at least 30% of the interior volume.

4. The germane storage and dispensing system of claim 2, wherein the activated carbon sorbent medium occupies at least 75% of the interior volume.

5. The germane storage and dispensing system of claim 2, wherein the activated carbon sorbent medium occupies at least 90% of the interior volume.

6. The germane storage and dispensing system of claim 2, wherein the activated carbon sorbent medium prior to adsorption thereon of germane gas has been treated to desorb extraneous sorbables therefrom, by at least one step selected from the group of steps consisting of:

(a) heating the activated carbon sorbent medium to thermally desorb extraneous sorbables therefrom;

(b) flowing a non-sorbable gas in contact with the activated carbon sorbent medium to desorb the extraneous sorbables from the activated carbon sorbent medium into the flowing non-sorbable gas; and (c) applying vacuum conditions to the activated carbon sorbent medium to vacuum desorb the extraneous sorbables from the activated carbon sorbent medium.

7. The germane storage and dispensing system of claim 6, wherein the activated carbon sorbent medium has been treated by step (a).

8. The germane storage and dispensing system of claim 6, wherein the activated carbon sorbent medium has been treated by step (b).

9. The germane storage and dispensing system of claim 6, wherein the activated carbon sorbent medium has been treated by step (c).

10. The germane storage and dispensing system of claim 2, wherein a pressure regulator is disposed in the interior volume of the gas storage and dispensing vessel, for controlling pressure of germane gas dispensed from the vessel.

11. The germane storage and dispensing system of claim 2, wherein a getter is disposed in said gas storage and dispensing vessel and arranged to selectively chemisorb hydrogen produced by decomposition of germane gas in said gas storage and dispensing vessel.

12. The germane storage and dispensing system of claim 11, wherein said getter is disposed in a protected relationship in said interior volume by a hydrogen-permeable membrane isolating said gedder from permeation thereto of gases other than hydrogen.

13. The germane storage and dispensing system of claim 2, further comprising a hydrogen sensor disposed in the interior volume of the gas storage and dispensing vessel, and operatively arranged to emit a signal indicative of presence of hydrogen gas in the interior volume.

14. The germane storage and dispensing system of claim 2, wherein said means for desorbing germane from said sorbent medium and dispensing same from the vessel, comprise a valve head assembly coupled to said gas storage and dispensing vessel, said valve head assembly including a flow control valve therein, which is selectively activatable to open the flow control valve for dispensing of germane gas from the vessel.

15. The germane storage and dispensing vessel of claim 2, wherein the activated carbon sorbent medium is the pyrolysis product of a synthetic hydrocarbon resin.

16. The germane storage and dispensing system of claim 2, wherein the activated carbon sorbent medium is the pyrolysis product of a naturally occurring material.

17. The germane storage and dispensing system of claim 2, wherein the activated carbon sorbent medium is provided in a divided form.

18. The germane storage and dispensing system of claim 17, wherein said divided form comprises a generally spherical particulate form.

19. The germane storage and dispensing system of claim 2, wherein the activated carbon sorbent medium comprises bead activated carbon.

20. The germane storage and dispensing system of claim 2, wherein the activated carbon sorbent medium is in a form selected from the group consisting of beads, granules, pellets, tablets, powders, particulates, extrudates, cloth, web form materials, honeycomb, monolithic forms, composites, and comminuted and crushed forms thereof.

21. The germane storage and dispensing system of claim 2, wherein said means for desorbing germane from said sorbent medium and dispensing same from the vessel include at least one device selected from the group consisting of valves, regulators, monitors, sensors, flow directing means, pressure controllers, mass flow controllers, piping, instrumentation, and start and shut-off devices.

22. The germane storage and dispensing system of claim 2, wherein pressure in said gas storage and dispensing vessel is in a range of from 10 to 750 torr.

23. The germane storage and dispensing system of claim 2, wherein pressure in said gas storage and dispensing vessel is superatmospheric pressure.

24. The germane storage and dispensing system of claim 23, wherein said superatmospheric pressure does not exceed about 50 psig.

25. The germane storage and dispensing system of claim 2, wherein said means for desorbing germane from said sorbent medium and dispensing same from the vessel, comprise means for thermally desorbing germane gas from said activated carbon sorbent medium.

26. The germane storage and dispensing system of claim 2, wherein said means for desorbing germane from said sorbent medium and dispensing same from the vessel, comprise a germane dispensing assembly constructed and arranged for effecting pressure-mediated desorption of germane gas from said activated carbon sorbent medium.

27. A method of preparing an activated carbon sorbent material for use in storing and dispensing of germane, said method comprising:

purging the sorbent material with inert gas;

evacuating the inert gas from the sorbent material;

heating the sorbent material under vacuum to elevated temperature, and maintaining said vacuum and elevated temperature for sufficient time to dehydrate the sorbent material;

cooling the sorbent material under vacuum to ambient temperature;

passivating the sorbent material with germane gas, at elevated temperature;

removing the passivating germane gas from the sorbent material; and cooling the sorbent material under vacuum to ambient temperature.

* * * * *